(12) United States Patent
Noguchi

(10) Patent No.: US 8,395,670 B2
(45) Date of Patent: Mar. 12, 2013

(54) IMAGE CAPTURING APPARATUS

(75) Inventor: Masaaki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 12/902,034

(22) Filed: Oct. 11, 2010

(65) Prior Publication Data
US 2011/0115929 A1 May 19, 2011

(30) Foreign Application Priority Data

Nov. 16, 2009 (JP) ................. 2009-261132

(51) Int. Cl.
H04N 5/228 (2006.01)
H04N 5/225 (2006.01)
G03B 17/00 (2006.01)

(52) U.S. Cl. ........... 348/208.11; 348/208.99; 348/208.2; 348/208.4; 348/208.7; 348/220.1; 396/52; 396/55

(58) Field of Classification Search ............... 348/208.99–208.16, 220.1–222.1, 348/240.99–240.3, 333.01–333.11, 335, 348/342; 396/52–55, 85–87
See application file for complete search history.

(56) References Cited

U.S. PATENT DOCUMENTS

| 6,097,896 | A * | 8/2000 | Usui ............ 396/55 |
| 2007/0058957 | A1 * | 3/2007 | Hosoda .......... 396/55 |
| 2007/0196084 | A1 * | 8/2007 | Shibata ........... 396/55 |
| 2009/0003813 | A1 | 1/2009 | Ohishi |
| 2009/0086033 | A1 * | 4/2009 | Watanabe et al. ...... 348/208.2 |
| 2009/0128636 | A1 * | 5/2009 | Wakagi et al. ........ 348/208.1 |
| 2009/0141134 | A1 * | 6/2009 | Kamiya et al. ........ 348/208.7 |
| 2009/0160952 | A1 * | 6/2009 | Nakakuki et al. ...... 348/208.4 |
| 2009/0185042 | A1 * | 7/2009 | Miyahara ............. 348/208.4 |
| 2009/0185796 | A1 * | 7/2009 | Tsutsumi et al. ........ 396/55 |
| 2009/0225177 | A1 * | 9/2009 | Maeda et al. ........ 348/208.99 |
| 2009/0231444 | A1 * | 9/2009 | Shibata ............. 348/208.1 |
| 2010/0128133 | A1 * | 5/2010 | Lee .................. 348/208.5 |
| 2010/0172639 | A1 | 7/2010 | Ohishi |
| 2011/0043646 | A1 * | 2/2011 | Watanabe et al. ...... 348/208.4 |

FOREIGN PATENT DOCUMENTS

| EP | 1959677 A2 | 8/2008 |
| JP | 2008-203312 A | 9/2008 |

* cited by examiner

Primary Examiner — Jason Chan
Assistant Examiner — Michael Osinski
(74) Attorney, Agent, or Firm — Canon U.S.A., Inc. IP Division

(57) ABSTRACT

An apparatus capable of capturing a still image in a moving image capturing mode includes an instruction unit configured to instruct still image capturing, a vibration detection unit configured to detect vibration applied to the apparatus, a control unit configured to control driving of a correction member in a driving range according to whether still image capturing or moving image capturing is performed, based on an output from the vibration detection unit, a position detection unit configured to detect a position of the correction member, and a determination unit configured to determine a reference position of a range in which the correction member is driven, wherein, if the instruction unit instructs image capturing in the moving image capturing mode, the detected position is set as the reference position.

14 Claims, 9 Drawing Sheets

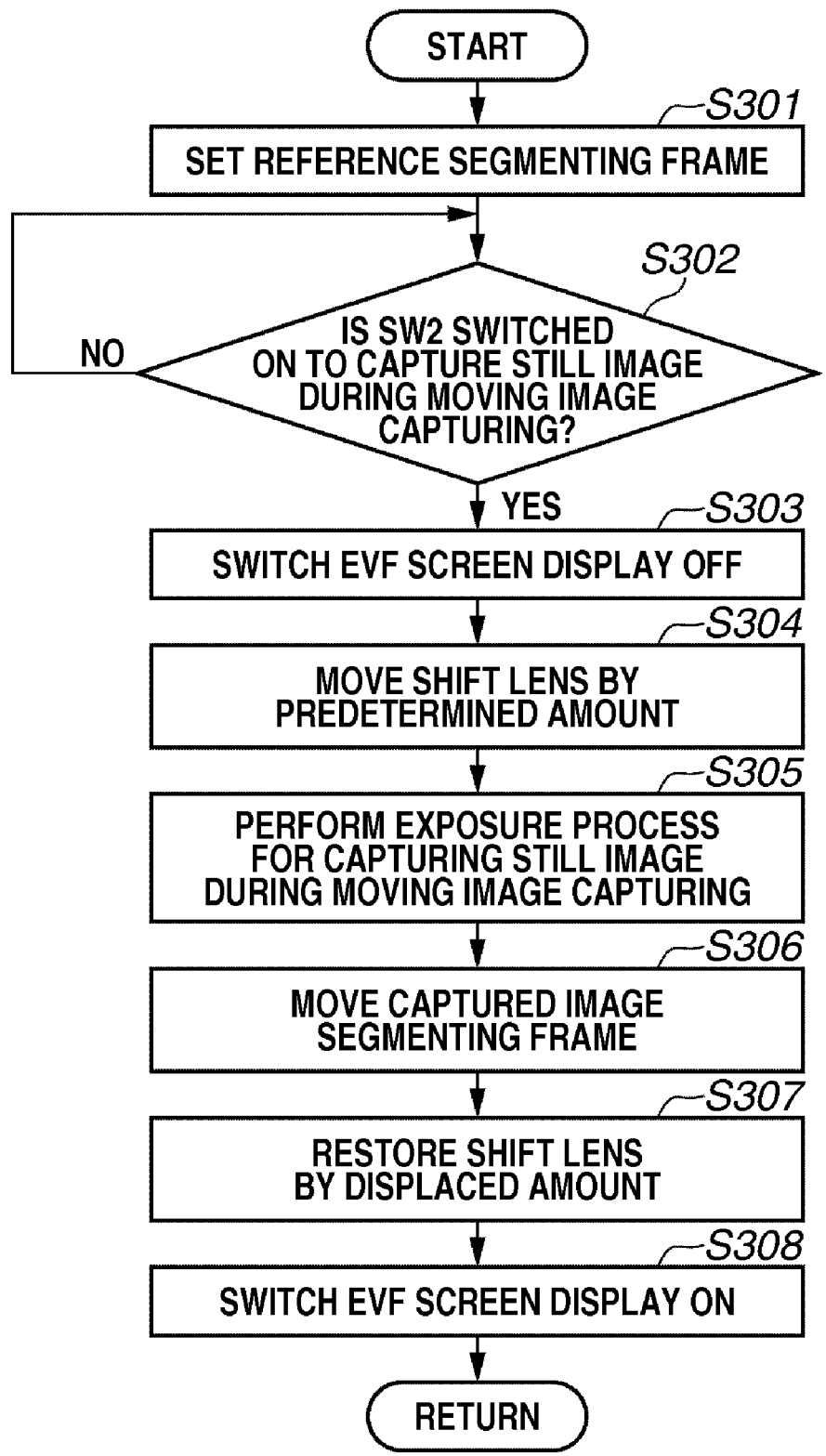

FIG.8A
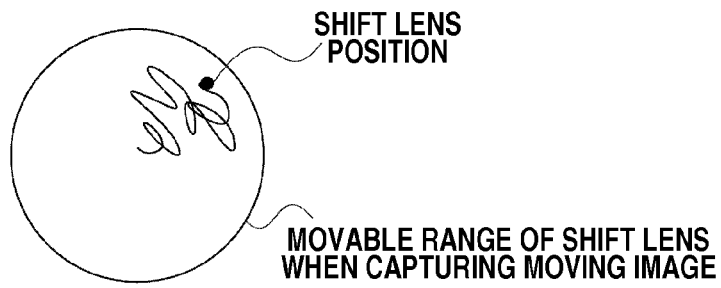
SHIFT LENS POSITION
MOVABLE RANGE OF SHIFT LENS WHEN CAPTURING MOVING IMAGE
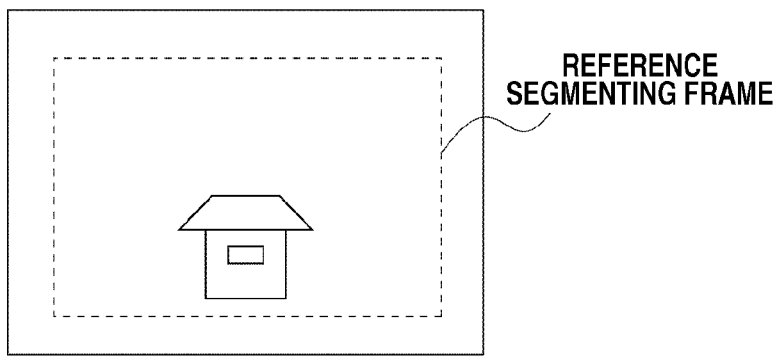
REFERENCE SEGMENTING FRAME
FIG.8B
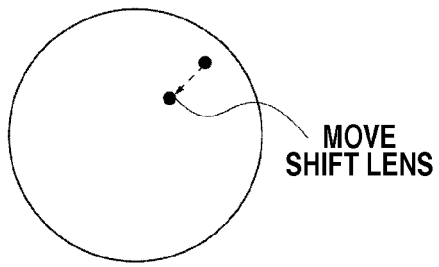
MOVE SHIFT LENS
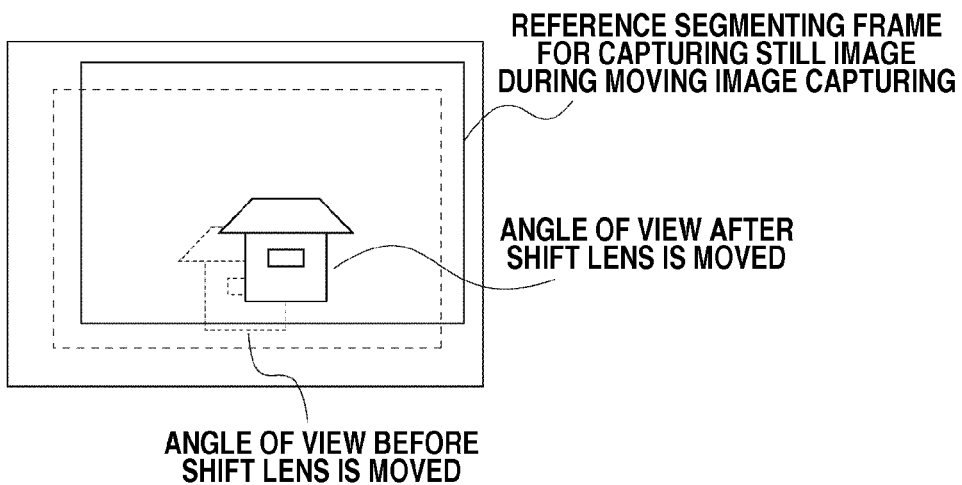
REFERENCE SEGMENTING FRAME FOR CAPTURING STILL IMAGE DURING MOVING IMAGE CAPTURING
ANGLE OF VIEW AFTER SHIFT LENS IS MOVED
ANGLE OF VIEW BEFORE SHIFT LENS IS MOVED

IMAGE CAPTURING APPARATUS

BACKGROUND OF THE INVENTION

1. Field of the Invention

The present invention relates to an image capturing apparatus that includes a function for correcting image vibration.

2. Description of the Related Art

Conventionally, there is an image capturing apparatus that includes a vibration correction apparatus which detects vibration of the image capturing apparatus. The vibration correction apparatus then drives a shift lens or an image sensor, i.e., a movable vibration correction unit, to correct image vibration generated by the vibration of the image capturing apparatus.

In a case of capturing a still image, a photographer remains stationary with respect to an object while capturing the image. Since image quality of the captured image is important in still image capturing, it is desirable to reduce degradation of optical performance of an imaging optical system as much as possible. Thus, the image is to be captured by positioning the vibration correction unit near an optical axis.

Japanese Patent Application Laid-Open No. 2008-203312 discusses an image capturing apparatus that moves, when the user starts capturing an image, the shift lens to a proximate center of a driving range thereof (i.e., performs centering of the shift lens). The user selects whether the image capturing apparatus is to perform centering. By centering the shift lens to the proximate center position as described above, degradation of the optical performance of the imaging optical system can be reduced when capturing the image. Further, the image capturing apparatus performs centering while capturing an image to acquire a wider range in which the vibration generated when capturing the image can be corrected. As a result, vibration correction becomes effective even for larger vibration.

However, the centering performed in the conventional technique discussed in the above-described Japanese Patent Application Laid-Open No. 2008-203312 increases a release time lag and changes the image composition before and after photographing. Further, when the still image is to be captured during capturing of a moving image, the image composition changes due to the centering, especially when the vibration correction unit is located at an end of the correctable range.

SUMMARY OF THE INVENTION

According to an aspect of the present invention, an apparatus capable of capturing a still image in a moving image capturing mode includes an instruction unit configured to instruct still image capturing, a vibration detection unit configured to detect vibration applied to the apparatus, a control unit configured to control driving of a correction member in a driving range according to whether still image capturing or moving image capturing is performed, based on an output from the vibration detection unit, a position detection unit configured to detect a position of the correction member, and a determination unit configured to determine a reference position of a range in which the correction member is driven, wherein, if the instruction unit instructs image capturing in the moving image capturing mode, the detected position is set as the reference position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B are flowcharts illustrating a vibration control process performed by the image capturing apparatus according to a second exemplary embodiment of the present invention.

FIGS. 8A and 8B illustrate a shift lens position and an image clipping position according to the second exemplary embodiment of the present invention.

DESCRIPTION OF THE EMBODIMENTS

Various exemplary embodiments, features, and aspects of the invention will be described in detail below with reference to the drawings.

Figure 1:
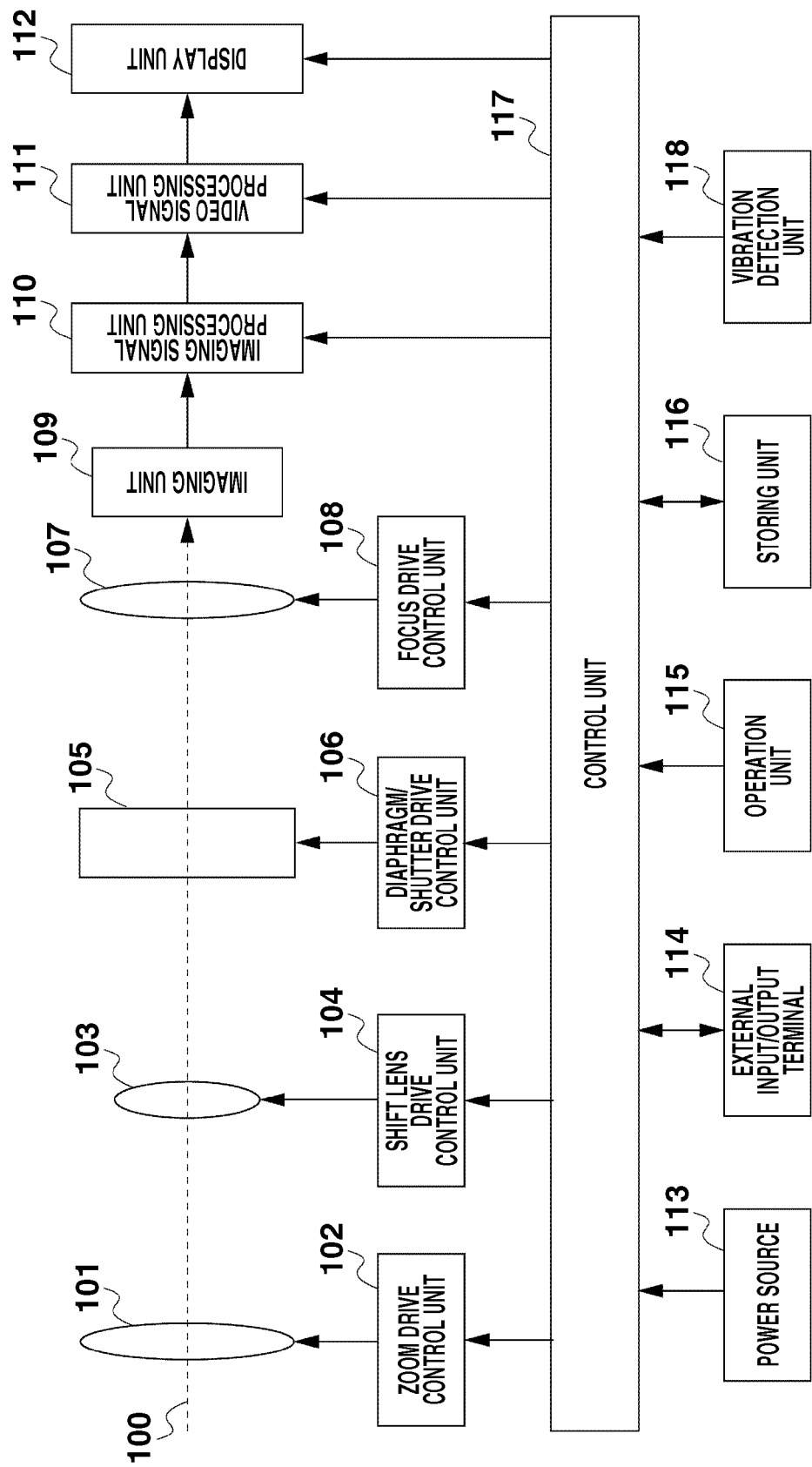
FIG. 1 illustrates a configuration of an image capturing apparatus according to an exemplary embodiment of the present invention.

FIG. 1 is a block diagram illustrating a configuration of an image capturing apparatus according to a first exemplary embodiment of the present invention. The image capturing apparatus is mainly a digital camera for capturing still images and moving images.

Referring to FIG. 1, a zoom lens unit 101 can change a zoom ratio by changing the position of a zoom lens in a direction parallel to an optical axis 100. Hereinafter, the position of the zoom lens unit 101 will be referred to as a zoom position. Further, the zoom position in which an image capturing angle of view is on a wide angle side (i.e., of a lower zoom ratio) will be referred to as a wide side. Furthermore, the zoom position in which the image capturing angle of view is on a telephoto side (i.e., of a higher zoom ratio) will be referred to as a telephoto side.

A zoom drive control unit 102 controls driving of the zoom lens unit 101. A shift lens unit 103 (i.e., a correction member) is capable of correcting the angle of view (i.e., perform image vibration correction) by changing the position of the shift lens in a direction perpendicular to the optical axis 100. A shift lens drive control unit 104 controls driving of the shift lens unit 103 and controls a main clock period and an operation sampling period of an operation processing unit.

The angle of vibration which can be corrected by the shift lens unit 103 changes according to the position of the zoom lens unit 101. More specifically, a range of a vibration correction angle becomes wider as the position of the zoom lens unit 101 changes from a telephoto end towards the wide end, without changing the driving range itself. According to the present exemplary embodiment, enlargement is performed between the wide end and the telephoto end by employing linear interpolation or focal distance interpolation. However, enlargement may be performed only at the wide end, or from the wide end to an arbitrary middle zoom point.

A diaphragm/shutter drive control unit 106 controls driving of a diaphragm/shutter unit 105. A focus lens unit 107 performs focus adjustment by changing the position of the focus lens in a direction parallel to the optical axis 100. A focus drive control unit 108 controls driving of the focus lens unit 107. As described above, according to the present exemplary embodiment, the imaging optical system includes the zoom lens unit 101, the shift lens unit 103, the diaphragm/shutter unit 105, and the focus lens unit 107.

An imaging unit 109 converts an optical image transmitted through each lens group to electric signals. The electric signals include pixel arrangement information corresponding to the entire imaging area (entire imaging surface) of an image sensor in the imaging unit 109. The image sensor is formed by arranging photoelectric conversion elements (image sensor) each configuring a pixel unit in a lattice form within an imaging surface. The imaging unit 109 outputs the read image signal.

An imaging signal processing unit 110 performs amplification and analog/digital (A/D) conversion on the image signal output from the imaging unit 109. Further, the imaging signal processing unit 110 performs various correction processes, such as correction of scratches on the image data after performing the A/D conversion and compression of the image data. A video signal processing unit 111 (i.e., a changing unit) processes a video signal output from the imaging signal processing unit 110 according to its use. For example, the video signal processing unit 111 sets a segmenting frame for setting a portion of the entire imaging area to be output as a captured image instead of outputting the entire imaging area. The area segmented using the segmenting frame is thus output as the captured image.

A display unit 112 displays the image based on the signal output from the video signal processing unit 111. Further, an electronic view finder (EVF) may be realized by sequentially displaying captured image data on the display unit 112. Furthermore, various menu items related to settings on the image capturing apparatus 1 may be displayed along with the images or by themselves. A user can thus change the setting in a designated item by appropriately selecting from the menu items displayed on the display unit 112 by operating on an operation unit 115.

A power source 113 supplies power to the entire system according to use. An external input/output terminal 114 inputs and outputs communication signals and video signals to and from an external device. The operation unit 115 such as a button, switch, or a touch panel is a member for reflecting menu operations of the user. For example, the operation unit 115 includes a mode changing switch for switching between a moving image capturing mode and a still image capturing mode. A storing unit 116 stores various data such as video information. A control unit 117 controls the entire system. A vibration detection unit 118 detects vibration applied to the image capturing apparatus from the hands of the user.

An outline of the operation of the above-described image capturing apparatus will be described below.

The operation unit 115 includes a still image capturing release switch for the user to instruct still image capturing, and a moving image switch for the user to instruct moving image capturing.

The still image capturing release switch includes a shutter release button by which a first switch (SW1) and a second switch (SW2) are sequentially switched on according to a pressing amount in a release operation by the user. If the user half-presses the shutter release button (i.e., performs a first release operation), the switch SW1 is switched on. If the user fully-presses the shutter release button (i.e., performs a second release operation), the switch SW2 is switched on.

When the user switches on the switch SW1, the image capturing apparatus starts a still image capturing preparation operation, and the focus drive control unit 108 drives the focus lens unit 107 to perform focus adjustment. Further, the diaphragm/shutter drive control unit 106 drives the diaphragm/shutter unit 105 and sets an appropriate exposure amount.

When the user switches on the switch SW2, the image capturing apparatus starts the still image capturing operation and records the image data acquired from the optical image falling on the imaging unit 109, in the storing unit 116.

Further, if the user presses the still image capturing release switch while capturing the moving image, the still image can be captured while capturing the moving image (hereinafter referred to as capturing a still image during moving image capturing).

Furthermore, the operation unit 115 includes an image stabilizing switch that allows user to select a vibration correction (image stabilizing) mode. If the user selects the vibration correction mode by pressing the image stabilizing switch, the control unit 117 instructs the shift lens drive control unit 104 to perform an image stabilizing operation. Upon receiving such instruction, the shift lens drive control unit 104 performs the image stabilizing operation until the user instruction to stop the operation is issued.

Moreover, the operation unit 115 includes a zoom switch for the user to instruct zooming. If the user instructs zooming by operating on the zoom switch, the zoom drive control unit 102 that receives the instruction via the control unit 117 moves the zoom lens unit 101 to the instructed zoom position. Further, the focus drive control unit 108 drives the focus lens unit 107 and performs focus adjustment according to the image information processed by the imaging signal processing unit 110 and the video signal processing unit 111 and transmitted from the imaging unit 109.

Figure 2:
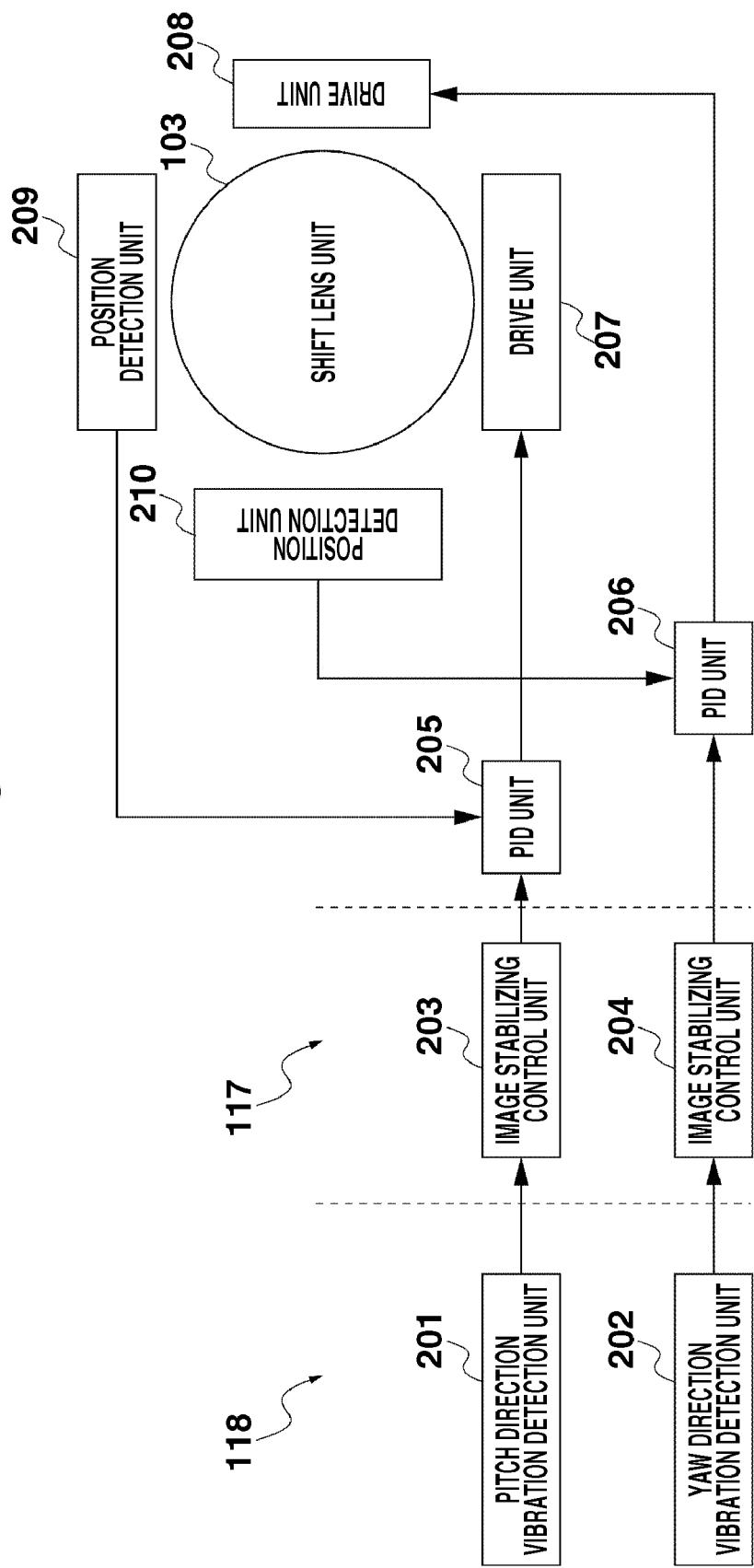
FIG. 2 is a block diagram illustrating an internal configuration of a shift lens drive control unit.

FIG. 2 is a block diagram illustrating an internal configuration of the shift lens drive control unit 104 and the pre-processing units illustrated in FIG. 1.

Referring to FIG. 2, when the image capturing apparatus is in a normal position (i.e., a longitudinal direction of the image frame proximately matches a horizontal direction), a pitch direction vibration detection unit 201 detects the vibration in a vertical direction (pitch direction). Further, when the image capturing apparatus is in a normal position, a yaw direction vibration detection unit 202 detects the vibration in a horizontal direction (yaw direction). According to the present exemplary embodiment, the pitch direction vibration detection unit 201 and the yaw direction vibration detection unit 202 are gyroscope sensors that detect and output an angular speed of the vibration applied to the image capturing apparatus.

Image stabilizing control units 203 and 204 determine a drive target position of the shift lens unit 103 in the pitch direction and the yaw direction respectively. The image stabilizing control units 203 and 204 thus perform image vibration correction control (image stabilizing control) and shift lens position control.

Proportional-Integral-Derivative (PID) units 205 and 206 perform feedback control. More specifically, the PID units 205 and 206 acquire control amounts from deviations between correction position control (drive target position) signals from each of the pitch direction and the yaw direction and a position signals indicating the position of the shift lens unit 103. The PID units 205 and 206 then output position instruction signals.

Drive units 207 and 208 each drive the shift lens unit 103 based on the position instruction signals transmitted from the PID units 205 and 206. Position detection units 209 and 210 detect the position of the shift lens unit 103 in the pitch direction and the yaw direction respectively using, for example, a hall element.

The position control of the shift lens unit 103 performed by the shift lens drive control unit 104 will be described below.

The shift lens drive control unit 104 performs position control of the shift lens unit 103 by driving the shift lens unit 103 in the pitch direction and the yaw direction according to the vibration signals from the pitch direction vibration detection unit 201 and the yaw direction vibration detection unit 202. The vibration signals indicate the vibration of the image capturing apparatus in the pitch direction and the yaw direction. According to the present exemplary embodiment, the pitch direction vibration detection unit 201 and the yaw direction vibration detection unit 202 illustrated in FIG. 2 are gyroscope sensors that detect the angular speed, so that the vibration signals become angular speed signals.

A magnet is integrally attached to the shift lens unit 103. The position detection units 209 and 210 thus detect a magnetic field of the magnet and transmit the position signals indicating the actual position of the shift lens unit 103 to each of the PID units 205 and 206. If there are individual variations among the position signals output from the position detection units 209 and 210, the output is to be controlled from the position detection units 209 and 210 so that the shift lens unit 103 moves to a predetermined position with respect to a predetermined correction position control signal.

The image stabilizing unit 203 (or 204) then outputs the correction position control signal (i.e., a drive target position) for moving the shift lens unit 103 in a direction of correcting the image vibration generated by the vibration of the image capturing apparatus. The image stabilizing unit 203 (or 204) outputs the correction position control signal according to the vibration signal output from the pitch direction vibration detection unit 201 (or the yaw direction vibration detection unit 202).

The PID units 205 and 206 perform PID control so that the position signals detected by the position detection unit 209 and 210 each converge to the correction position control signals transmitted from the image stabilizing control units 203 and 204. The PID units 205 and 206 perform PID control in which proportional control, integral control, and derivative control are selectively combined. As a result, the image vibration is corrected even when there is camera shake of the image capturing apparatus.

Figure 3:
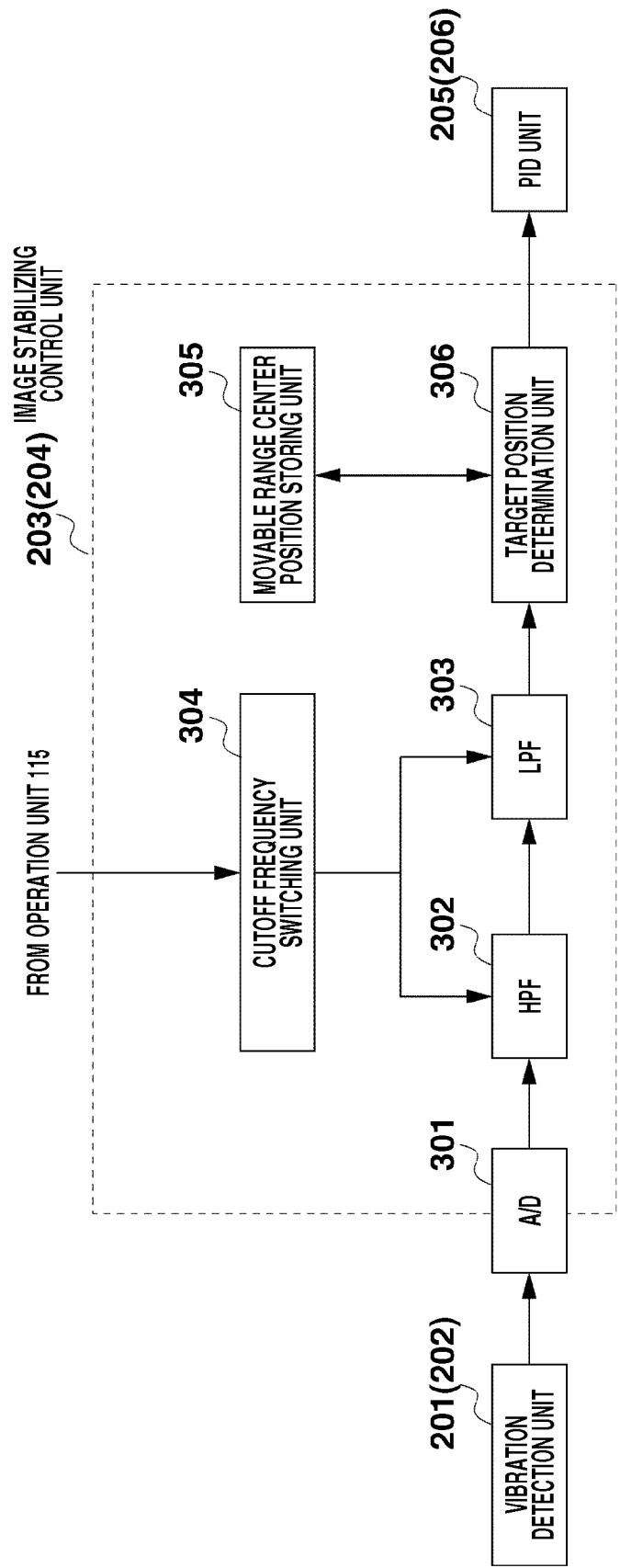
FIG. 3 is a block diagram illustrating an internal configuration of an image stabilizing control unit.

FIG. 3 is a block diagram illustrating in detail the configuration of the image stabilizing control units 203 and 204.

Referring to FIG. 3, an A/D conversion unit 301 converts the analog vibration signal (angular speed signal) output from the vibration detection unit to a digital signal 201 (and 202). A high pass filter (HPF) 302 cuts a direct current (DC) component of the vibration signal output from the vibration detection unit 201 (and 202). A low pass filter (LPF) 303 converts the vibration signal (angular speed signal) converted to the digital signal by the A/D conversion unit 301 to the correction signal (angle signal). A cutoff frequency switching unit 304 switches the cutoff frequencies of the HPF 302 and the LPF 303 according to the user switching between the moving image capturing and the still image capturing on the operation unit 115. On the other hand, it may also be configured such that according to the user's switching between the moving image capturing and the still image capturing on the operation unit 115, an offset amount to be subtracted from the correction signal is changed.

A driving range center position storing unit 305 stores a reference position of a driving range of the shift lens unit 103 (i.e., a center of the driving range when the driving range is circular or a polygon circumscribing a circle or close to such a shape). The center position of the shift lens in the shift lens unit 103 is set based on the optical performance, and is the position that becomes the center of an area in which the shift lens unit 103 is driven when correcting the camera shake. A target position determination unit 306 determines a target position based on the information from the LPF 303 and the drive range center position storing unit 305. The above-described processes are performed on the angular speed signals input to the image stabilizing control units 203 and 204, so that the correction position control signal is output and then input to the PID unit 206.

Figure 4:
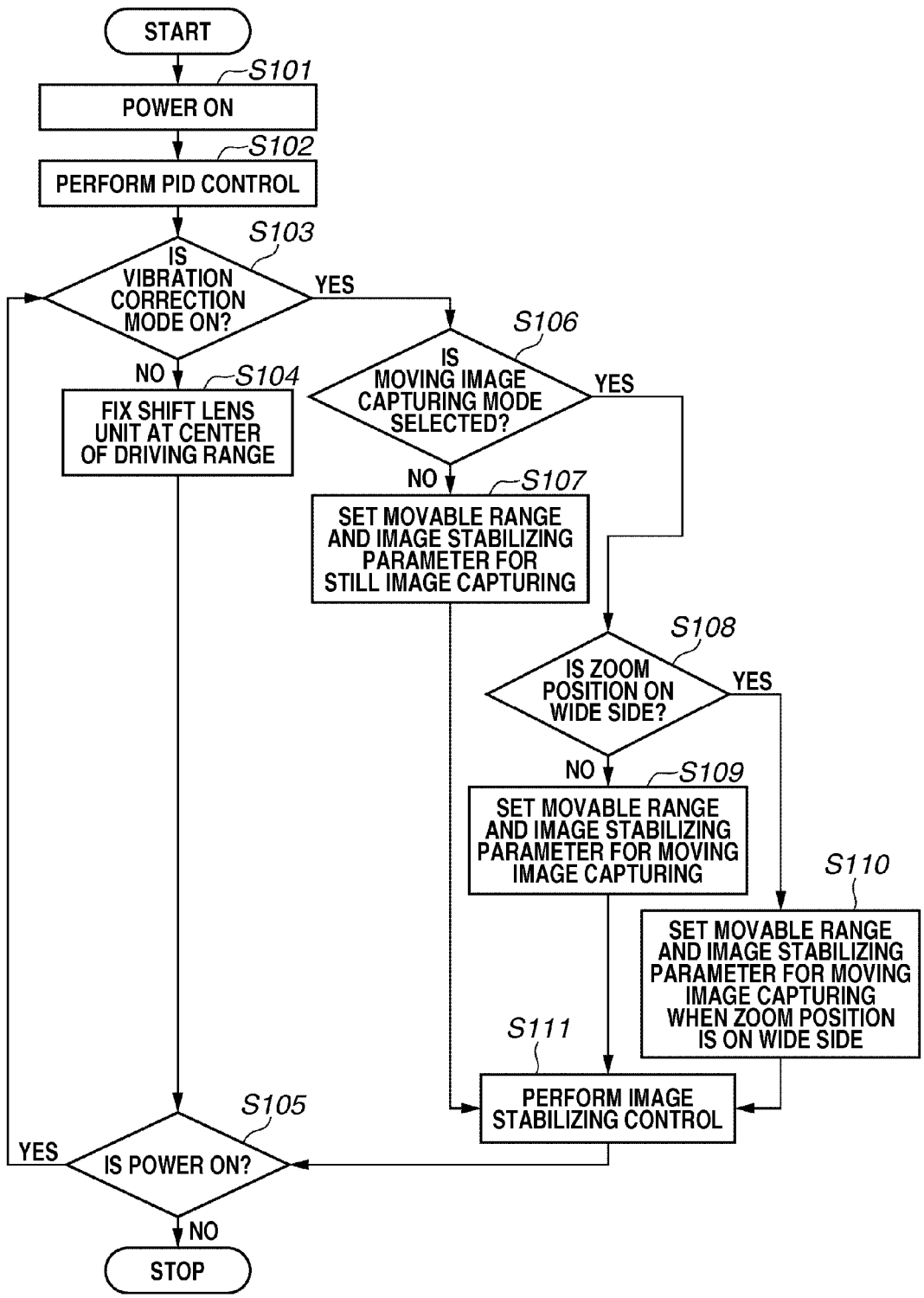
FIG. 4 is a flowchart illustrating a vibration control process performed by the image capturing apparatus according to a first exemplary embodiment of the present invention.

A vibration correction process performed by the above-described image capturing apparatus will be described below with reference to the flowchart illustrated in FIG. 4.

In step S101, the user switches on the image capturing apparatus. In step S102, the PID units 205 and 206 perform. PID control so that the position signals detected by the position detection units 209 and 210 each converge to the correction position control signals transmitted from the image stabilizing control units 203 and 204. The camera shake correction process is performed by an interruption process generated at every constant period (e.g., 125 μsec). According to the present exemplary embodiment, the PID units 205 and 206 perform PID control in two directions, such as the pitch direction (vertical direction) and the yaw direction (horizontal direction).

In step S103, the control unit 117 determines whether the user has selected the vibration correction mode by using the image stabilization switch of the operation unit 115. If the camera shake correction mode is off (NO in step S103), the process proceeds to step S104. In step S104, the shift lens drive control unit 104 (i.e., image stabilizing control units 203 and 204 illustrated in FIG. 2) fixes the shift lens unit 103 at the center of the driving range. In other words, when the shift lens unit 103 is to be fixed at the center, control is performed so that the image stabilizing control units 203 and 204 output 0 as the vibration signal to set that there is no vibration.

On the other hand, if the camera shake correction mode is on (YES in S103), the process proceeds to step S106. In step S106, the control unit 117 determines whether the user has selected the moving image capturing mode as the image capturing mode to identify the type of the current image capturing mode. If the selected mode is not the moving image capturing mode, i.e., the still image capturing mode is selected (NO in step S106), the process proceeds to step S107. In step S107, the shift lens drive control unit 104 sets the driving range and an image stabilizing parameter of the shift lens unit 103 for capturing a still image capturing. The image stabilizing parameter is a setting value related to the image stabilizing control such as panning control (i.e., an image stabilizing control performed when the orientation of the image capturing apparatus is panned in one direction without greatly changing the position).

If the control unit 117 determines that the moving image capturing mode is selected (YES in step S106), the process proceeds to step S108. In step S108, the control unit 117 determines whether the zoom position is on the wide side. "Wide" may indicate the wide end, or that the zoom position is set towards the wide side as compared to an arbitrary zoom position. According to the present exemplary embodiment, the wide side is not limited to the wide end and indicates that the zoom position is set towards the wide side as compared to an arbitrary zoom position.

If the zoom position is not set on the wide side (NO in step S108), the process proceeds to step S109. In step S109, the control unit 117 sets the driving range of the shift lens unit 103 and the image stabilizing parameter for capturing the moving image at a zoom position other than on the wide side.

On the other hand, if the moving image capturing mode is selected and the zoom position is set on the wide side (YES in step S108), the process proceeds to step S110. In step S110, the control unit 117 sets the driving range of the shift lens unit 103 and the image stabilizing parameter for capturing the moving image on the wide side. Since the driving range of the shift lens unit 103 is wider on the wide side as compared to the telephoto side, the parameter for performing the panning control is similarly set to match the driving range on the wide side.

In step S111, the shift lens drive control unit 104 performs image stabilizing control. The process then proceeds to step S105. In step S105, the control unit 117 determines whether the power switch is still on. If the power is switched off (NO in step S105), the camera shake correction process is ended. If the power is on (YES in step S105), the process returns to step S103, and the process is repeated.

Figure 5:
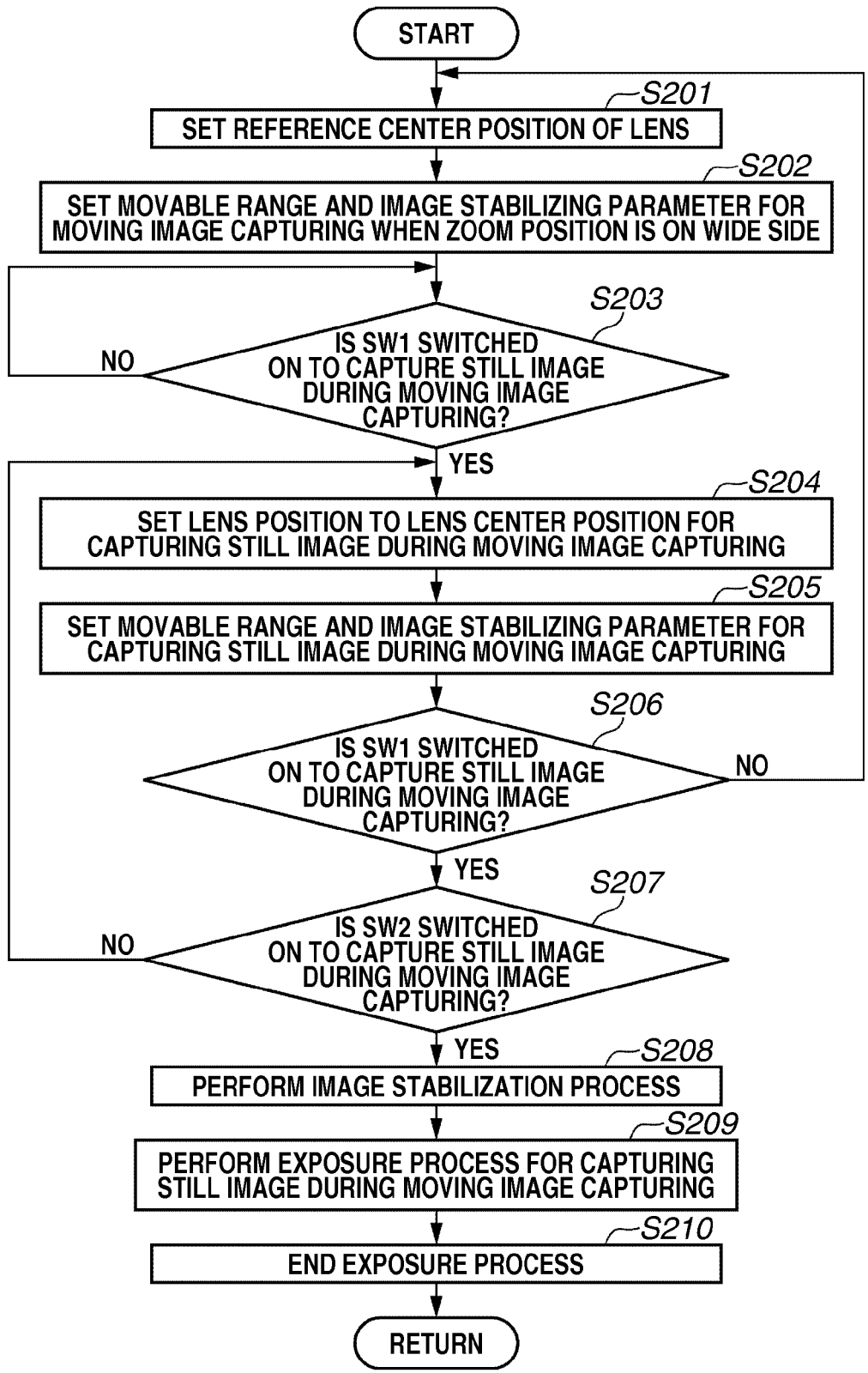
FIG. 5 is a flowchart illustrating a vibration control process performed by the image capturing apparatus according to a first exemplary embodiment of the present invention.

The image stabilizing control performed when a still image is captured in the moving image capturing mode, i.e., when the still image is captured during moving image capturing, will be described below with reference to the flowchart illustrated in FIG. 5. The flowchart of FIG. 5 illustrates a case where it is determined in step S108 of the flowchart illustrated in FIG. 4 that the zoom position of the shift lens unit 103 is on the wide side in the moving image capturing mode. The control unit 117 thus sets in step S110 the driving range of the shift lens unit 103 and the image stabilizing parameter for capturing the moving image on the wide side.

In step S201, the control unit 117 sets the center position (i.e., a reference center position) of the driving range of the shift lens unit 103 for capturing the image in a case where the zoom position is on the wide side in the moving image capturing mode. The reference center position is then stored in the driving range center position storing unit 305. In step S202, the control unit 117 sets the driving range and the image stabilizing parameter in a case where the zoom position is on the wide side in the moving image capturing mode.

In step S203, the control unit 117 determines whether the user has operated the still image release button (i.e., switched to SW1) in the operation unit 115. If the user has not switched on SW1 (NO in step S203), the process is looped until the user switches on SW1 in step S203. If the user has switched on SW1 (YES in step S203), the process proceeds to step S204.

In step S204, the control unit 117 sets the shift lens position held when the user presses the switch SW1, as the shift lens center position for capturing a still image during moving image capturing. Further, the driving range center position storing unit 305 stores the shift lens position held when the user presses the switch SW1. In step S205, the control unit 117 sets the driving range of the shift lens and the image stabilizing parameter when capturing a still image during moving image capturing, centering on the shift lens position held when the user presses SW1. The shift lens position held when the user presses SW1 stored in step S204 is used as the center when performing calculations for image stabilizing control such as the panning control.

In step S206, the control unit 117 determines whether the user is still pressing the still image release button as the switch SW1 in the operation unit 115. If the user has released the switch SW1 (NO in step S206), the process returns to step S201. The control unit 117 then restores the range in which the shift lens unit 103 is driven, from the shift lens center position set in step S204 by the user pressing the switch SW1 to the reference center position when the zoom position is on the wide side (i.e., a wide zoom) in the moving image capturing mode.

If the process returns to step S201 after the exposure process is completed in step S210 to restore the center position to the reference position, it is desirable to gradually restore the position so that the angle of view does not change drastically. In step S203, the driving range and the image stabilizing parameter are then reset to those of when the zoom position is on the wide side in the moving image capturing mode.

If the user is still pressing the switch SW1 or has pressed the switch SW2 (YES in step S206), the process proceeds to step S207. In step S207, if the user switches on SW2 in the operation unit 115 and the control unit 117 determines that the user has switched on SW2 (Yes in step S207), the process proceeds to step S208. On the other hand, if the control unit 117 determines that the user has not switched on SW2 (NO in step S207), the process returns to step S204. The control unit 117 then resets the shift lens position to the shift lens center position held when capturing a still image during moving image capturing. However, the control unit 117 may instead set the shift lens position held when the user presses the switch SW1 to the shift lens center position for capturing a still image capturing during moving image capturing and wait until the user presses the switch SW2.

In step S208, the control unit 117 performs image stabilizing control while maintaining the shift lens center position set when the user has pressed the switch SW1. In step S209, the exposure is performed for the still image captured during moving image capturing. After the exposure process is completed in step S210, the process returns to step S201. The control unit 117 then restores the driving range of the shift lens unit 103, from the shift lens center position set when the user presses the switch SW1 in step S204 to the reference center position held when the zoom position is at the wide side in the moving image capturing mode. In such a case, it is desirable to gradually restore the center position to the reference position so that the angle of view does not drastically change. In step S203, the driving range and the image stabilizing parameter are then reset to those of when the zoom position is on the wide side in the moving image capturing mode.

As described above, the shift lens position held when the user presses the switch SW1 is set as the center position for capturing a still image during moving image capturing. As a result, the angle of view set by focusing when the user presses the switch SW1 is reflected in the captured image, so that the angle of view is not greatly displaced before and after the user presses the switch SW1.

In the above-described exemplary embodiment, the expansion of the driving range in the moving image mode is performed only when the zoom position is on the wide side. However, the driving range which can be expanded and the matching image stabilizing parameter may be set at each zoom point so that the driving range is set wide on the wide side and becomes narrow towards the telephoto end.

Figure 6:
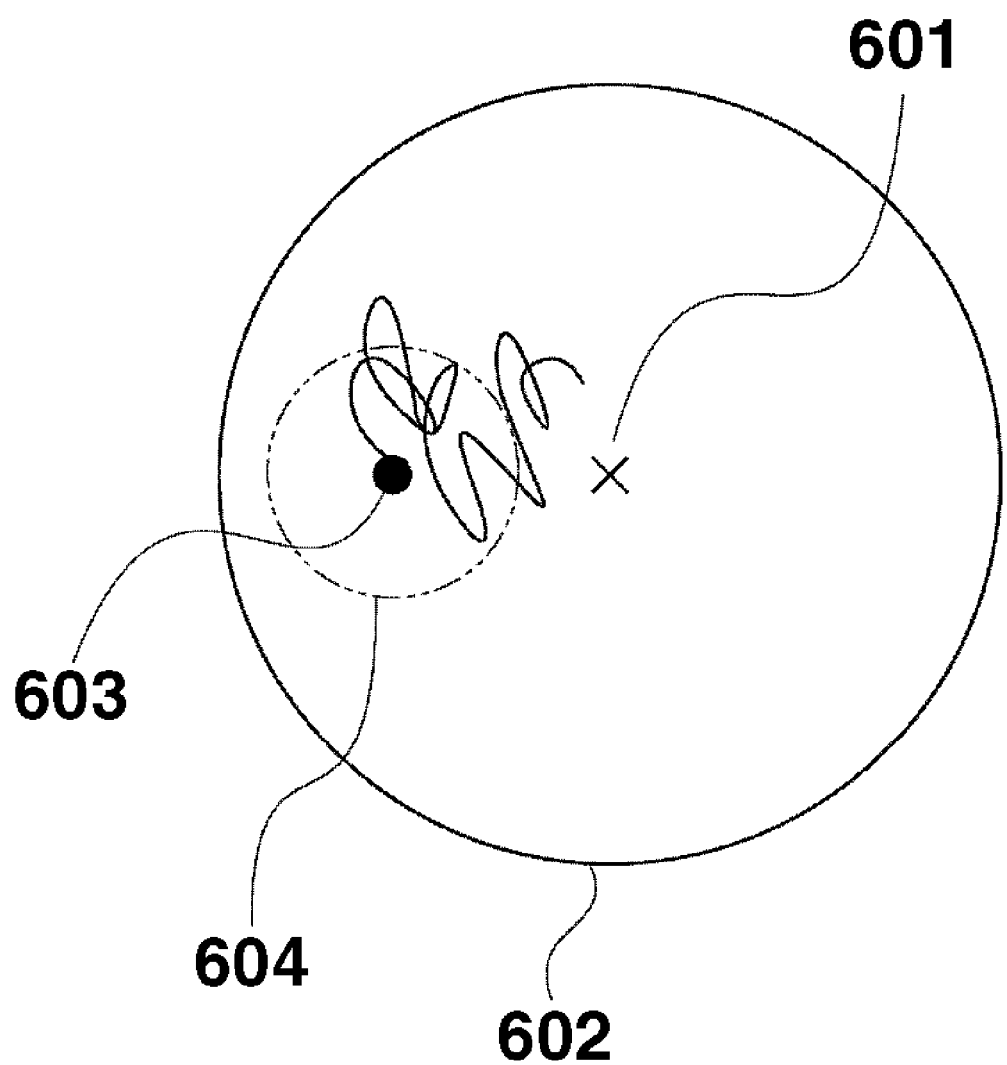
FIG. 6 illustrates a center position and a driving range of the shift lens.

FIG. 6 is a schematic diagram illustrating the driving range of the shift lens when capturing a still image during moving image capturing. A reference center position 601 is the reference center position of the shift lens in the moving image capturing mode which is set in step S201 illustrated in FIG. 5 and stored in the driving range center position storing unit 305. A driving range 602 is the driving range of the shift lens in the moving image capturing mode. According to the present exemplary embodiment, the driving range 602 is in particular the driving range for capturing the moving image when the zoom position is on the wide side.

A shift lens center position 603 is the shift lens position set by the control unit 117 in step S204 when the user presses the switch SW1 to capture the still image during the moving image capturing mode. The driving range center position storing unit 305 stores the shift lens position 603, and the calculations for performing the image stabilizing control such as the panning control is performed by setting the shift lens position 603 at the center.

The panning control is a process for switching, when the user performs a panning operation (and a tilt operation), i.e., slowly moves the image capturing apparatus in one direction, the cutoff frequencies of the HPF 302, the LPF 303, or both the HPF 302 and the LPF 303. As a result, the shift lens unit 103 does not readily come close to the end of the driving range and remains near the center of the driving range. If the user performs the panning operation in the moving image capturing mode, the shift lens unit 103 is controlled to return to the reference center position 601. If the user then switches the mode to the mode for capturing a still image during moving image capturing, the panning control is performed so that the shift lens is restored to the reference center position 601 in the moving image capturing mode held when the user pressed the switch SW1. As a result, the angle of view is prevented from drastically changing due to panning control.

Further, when frequency is to be calculated based on a distance from the center position of the shift lens unit 103, the distance from the reference center position 601 is used in the moving image capturing mode. If the user then switches the mode to the mode for capturing a still image during moving image capturing, the frequency is calculated based on a distance from the shift lens center position held when the user has pressed the switch SW1.

A driving range 604 is the driving range of the shift lens when capturing a still image during moving image capturing, determined in step S205. The driving range 604 is set using the shift lens position held when the user has pressed the switch SW1 or the updated shift lens position as the center.

According to the present exemplary embodiment, when the user presses the switch SW1, the control unit 117 sets the normal lens position to the shift lens center position held when capturing a still image during moving image capturing. However, the timing of specifying such a setting is not limited to when the user presses the switch SW1, and may be specified after focusing or after the exposure setting is completed, or after the user presses the switch SW2.

The image capturing apparatus according to a second exemplary embodiment of the present invention will be described below. A circuit configuration of the image capturing apparatus according to the second exemplary embodiment is similar to that according to the first exemplary embodiment. The difference from the first exemplary embodiment will be described in the second exemplary embodiment.

Figure 7B:
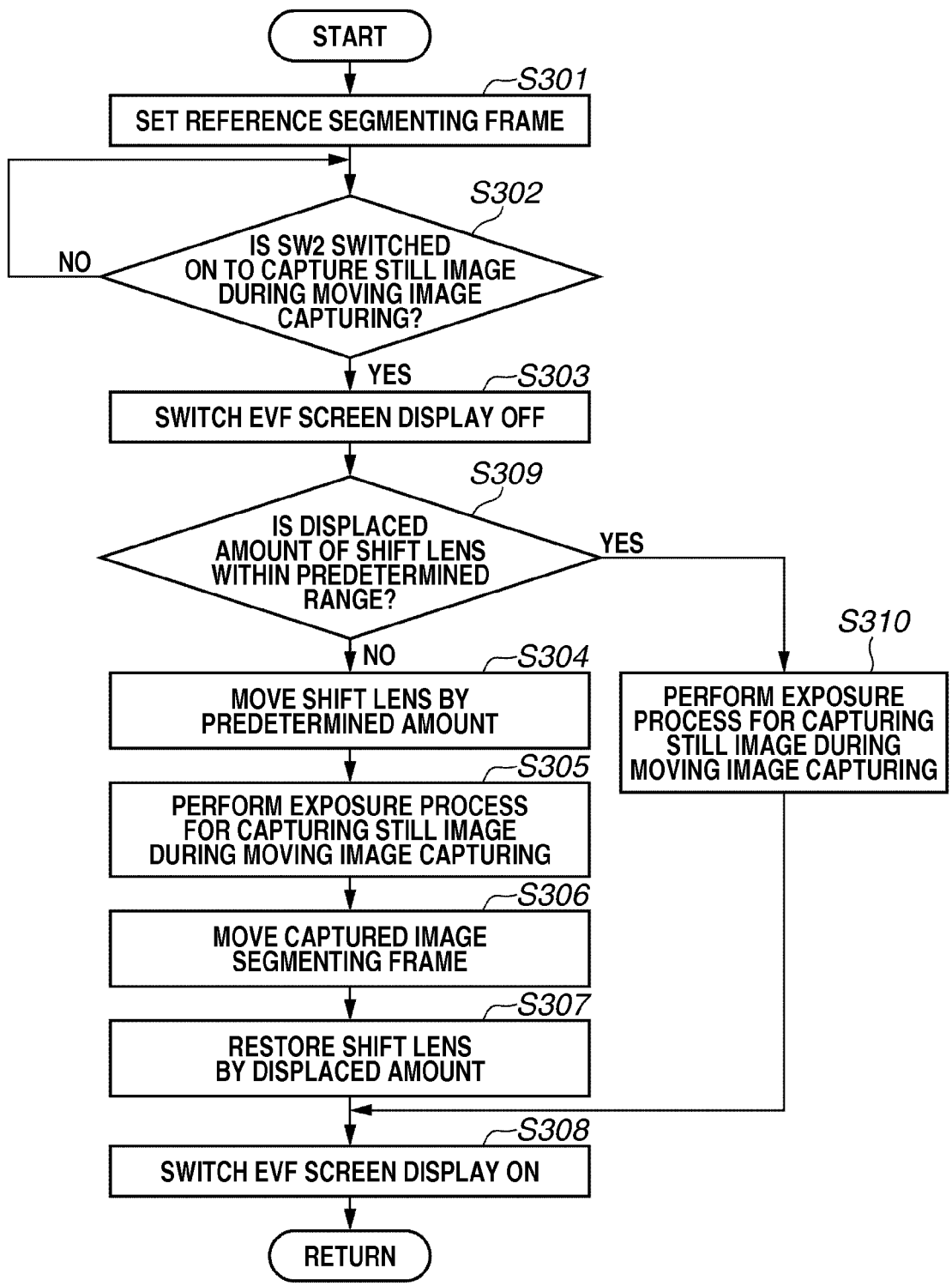

The vibration correction process performed when capturing an image according to the second exemplary embodiment will be described below with reference to the flowcharts illustrated in FIGS. 7A and 7B, and FIGS. 8A and 8B. According to the second exemplary embodiment, the image stabilizing control performed when capturing a still image in the moving image capturing mode, i.e., when capturing a still image during moving image capturing, will be described. The flowcharts of FIGS. 7A and 7B illustrate processes performed in the case where it is determined in step S108 of the flowchart illustrated in FIG. 4 that the zoom position is on the wide side in the moving image capturing mode. In such a case, the control unit 117 sets in step S110 the driving range of the shift lens unit 103 and the image stabilizing parameter for capturing the moving image on the wide side.

In step S301, the control unit 117 sets the segmenting frame of the captured image to the reference position and performs an EVF display or moving image capturing. The reference position is, for example, the center portion of the image sensor as illustrated in FIG. 8A. By setting the segmenting frame, the degradation of the optical performance which becomes conspicuous in the four corners of the captured image can be reduced. The degradation of the optical performance includes a decrease in peripheral light intensity or resolution reduction in a peripheral portion of the driving range of the shift lens unit 103.

In step S302, if the user does not operate the switch SW2 in the operation unit 115, the control unit 117 determines that the switch SW2 is not switched on (NO in step S302). The control unit 117 thus continues to perform EVF display or moving image capturing within the segmenting frame at the reference position set in step S301.

On the other hand, if the user operates the switch SW2 in the operation unit 115 and the control unit 117 determines that the switch SW2 is switched on (YES in step S302), the process proceeds to step S303 to capture a still image during moving image capturing. In step S303, the control unit 117 turns the display unit 112 off to turn off the image display on the EVF. In step S304, the control unit 117 moves the shift lens unit 103 by a predetermined amount towards the center of the driving range. It is desirable to determine a displacement amount of the shift lens unit 103 based on the shift lens position held when the user presses the switch SW2.

In step S305, the control unit 117 continues to perform image stabilization and also performs the exposure process for capturing a still image during moving image capturing. In step S306, the control unit 117 moves, after the exposure process is completed, the image segmenting frame in a direction in which the angle of view is shifted when the shift lens is moved in step S304. This is as illustrated in FIG. 8B. The size of the segmenting frame remains the same. In step S307, the control unit 117 restores the shift lens to the original position by the displaced amount before performing the exposure process. In step S308, the control unit 117 turns on the EVF screen display.

According to the present exemplary embodiment, the processes of step S304 to step S307 in which the shift lens and the segmenting frame are moved are performed while the EVF display is turned off after the user presses the release button SW2. As a result, the user can perform still image capturing without much regard of the movement of the angle of view.

Referring to the flowchart illustrated in FIG. 7B, it may be determined in step S309 before the shift lens is moved by a predetermined amount towards the center of the driving range in step S304, whether the shift lens unit 103 is within a predetermined range from the center when the user presses the switch SW2. If the shift lens unit 103 is within a predetermined range from the center when the switch SW2 is pressed (YES in step S309), the process proceeds to step S310 without performing the process of step S304. In step S310, the exposure process for capturing a still image during moving image capturing is performed while the image stabilizing process is performed similarly as in step S305. On the other hand, if the shift lens unit 103 is not within a predetermined range from the center when the switch SW2 is pressed (NO in step S309), the process proceeds to step S304.

In general, a greater number of pixels is used in still image capturing as compared to moving image capturing, so that the optical performance such as the resolution degradation is more severely observed in the still image capturing than the moving image capturing. However, the image capturing apparatus according to the present exemplary embodiment can prevent the degradation of the optical performance by moving the shift lens near the center when capturing the still image during moving image capturing. This is illustrated in the processes of the flowcharts of FIGS. 7A and 7B. Further, since the image segmenting position is changed according to the displacement of the shift lens before performing the exposure process, the angle of view is not changed.

Each of the methods performed in the first exemplary embodiment and the second exemplary embodiment are described above. The exemplary embodiment may provide an apparatus for decreasing the release time lag and/or reducing the change in the composition before and after capturing the image. Further, the apparatus may reduce, when the still image is to be captured during capturing of a moving image, the change in the composition due to centering, even when the vibration correction unit is at the end of the correctable range. The methods may also be combined. For example, when capturing a still image during moving image capturing, the shift lens is returned in the direction towards the center of the driving range after the user presses the switch SW2. The image stabilization is then performed by switching to the driving range and the image stabilization parameter of still image capturing centering on such a position. Degradation of the captured image due to degradation of the optical performance is thus prevented by performing image stabilization while capturing the image as described above. Degradation is prevented even when the still image is captured during moving image capturing in which the driving range is being expanded. Further, the change in the angle of view while performing image capturing can be eliminated.

The exemplary embodiments of the present invention are described above. However, the present invention is not limited to the above-described exemplary embodiments. For example, in the case of correcting camera shake in an image sensor shifting method, the shift lens unit 103 according to the present exemplary embodiment is replaced by the image sensor. Various modifications and changes can thus be performed within the range of the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-261132 filed Nov. 16, 2009, which is hereby incorporated by reference herein in its entirety.

What is claimed is:

1. An apparatus capable of capturing a still image in a moving image capturing mode, the apparatus comprising:
    an instruction unit configured to instruct still image capturing;
    a vibration detection unit configured to detect vibration applied to the apparatus;
    a control unit configured to control driving of a correction member in a driving range according to whether still image capturing or moving image capturing is performed, based on an output from the vibration detection unit;
    a position detection unit configured to detect a position of the correction member; and
    a determination unit configured to determine a reference position of a range in which the correction member is driven, wherein the detected position is set as the reference position if the instruction unit instructs still image capturing in the moving image capturing mode,
    wherein the range is set wider in the moving image capturing mode as compared to when capturing a still image in the moving image capturing mode.

2. The apparatus according to claim 1, wherein the range is a circular range with the reference position at a center or a polygonal range inscribed in a circle with the reference position at the center.

3. The apparatus according to claim 1, wherein the instruction unit allows a user to perform a first release operation for instructing to prepare for capturing a still image and a second release operation for instructing to start capturing the still image.

4. The apparatus according to claim 3, wherein the control unit performs, when the first release operation is performed while capturing an image in the moving image capturing mode, panning control based on a position of the correction member set when the first release operation is performed.

5. The apparatus according to claim 3, wherein the control unit performs, when the user performs the first release operation while capturing an image in the moving image capturing mode, drive control of the vibration correction member in a driving range of when the still image capturing is performed, and performs, when the user performs the second release operation and ends image capturing, or releases the first release operation, drive control of the vibration correction member in a driving range corresponding to the moving image capturing mode.

6. The apparatus according to claim 1, further comprising a changing unit configured to change an image segmenting position.

7. The apparatus according to claim 6, wherein the control unit moves the correction member to a center of the driving range such that an amount of change of a segmented image changed by the changing unit becomes the same as an amount the correction member is driven.

8. A method for controlling an apparatus capable of capturing a still image in a moving image capturing mode, method comprising:
    instructing still image capturing;
    detecting vibration applied to the apparatus;
    controlling driving of a correction member in a driving range according to whether still image capturing or moving image capturing is performed, based on an output from the vibration detection unit;
    detecting a position of the correction member;
    determining a reference position of a range in which the correction member is driven;
    setting the detected position as the reference position if the still image capturing is instructed in the moving image capturing mode; and
    setting the range wider in the moving image capturing mode as compared to when capturing a still image in the moving image capturing mode.

9. The method according to claim 8, wherein the range is a circular range with the reference position at a center or a polygonal range inscribed in a circle with the reference position at the center.

10. The method according to claim 8, further comprising allowing a user to perform a first release operation for instructing to prepare for capturing a still image and a second release operation for instructing to start capturing the still image.

11. The method according to claim 10, further comprising performing, when the first release operation is performed while capturing an image in the moving image capturing mode, panning control based on a position of the correction member set when the first release operation is performed.

12. The method according to claim 10, further comprising:
performing, when the user performs the first release operation while capturing an image in the moving image capturing mode, drive control of the vibration correction member in a driving range of when the still image capturing is performed; and
performing, when the user performs the second release operation and ends image capturing, or releases the first release operation, drive control of the vibration correction member in a driving range corresponding to the moving image capturing mode.

13. The method according to claim 8, further comprising changing an image segmenting position.

14. The method according to claim 13, further comprising moving the correction member to a center of the driving range such that an amount of change of a segmented image changed by the changing unit becomes the same as an amount the correction member is driven.

* * * * *